United States Patent
Bauer et al.

(10) Patent No.: US 10,029,796 B2
(45) Date of Patent: Jul. 24, 2018

(54) FIXTURE FOR ELECTRONIC DEVICES, VEHICLE SEAT WITH INTEGRATED FIXTURE AND METHOD FOR MOUNTING AN ELECTRONIC DEVICE IN A FIXTURE

(71) Applicant: Airbus Operations GmbH, Hamburg (DE)

(72) Inventors: Hans-Achim Bauer, Hamburg (DE); André Zybala, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/946,212

(22) Filed: Nov. 19, 2015

(65) Prior Publication Data
US 2016/0152340 A1    Jun. 2, 2016

(30) Foreign Application Priority Data
Nov. 28, 2014   (EP) ..................................... 14195478

(51) Int. Cl.
*B64D 11/06*   (2006.01)
*H02J 7/04*    (2006.01)
(Continued)

(52) U.S. Cl.
CPC .......... *B64D 11/0624* (2014.12); *B60R 11/02* (2013.01); *B64D 11/0015* (2013.01);
(Continued)

(58) Field of Classification Search
CPC .......... B64D 11/0015; B64D 11/00151; B64D 11/00152; B64D 11/00153; B64D 11/00155; B64D 11/0624; B60R 11/02; B60R 11/0235; B60R 2011/0071; H02J 7/025; H02J 7/042; G01R 1/04; G01R 11/04; G01R 19/00; B60N 3/00; A47C 31/126
(Continued)

(56) References Cited

U.S. PATENT DOCUMENTS 4,846,729 A  *  7/1989  Hikami ................ H01R 12/856
                                                              439/161
4,887,188 A  *  12/1989  Yoshida ............. G06K 13/0806
                                                              361/679.31
(Continued)

FOREIGN PATENT DOCUMENTS

FR            2954247 A1    6/2011

OTHER PUBLICATIONS

Extended European Search Report for Application No. 14195478 dated May 15, 2015.

*Primary Examiner* — Hoai-An D Nguyen
(74) *Attorney, Agent, or Firm* — Jenkins, Wilson, Taylor & Hunt, P.A.

(57) ABSTRACT

A fixture for electronic devices includes a substantially planar receptacle, and a mounting framework arranged at least partially at the surrounding edges of the receptacle, the mounting framework having at least one framework component made from a shape memory material and/or an electro-active polymer, wherein the framework component exhibits a relaxed state and a triggered state in which the framework component is moved or flexed inwardly into the area of the receptacle.

12 Claims, 4 Drawing Sheets

(51) Int. Cl.
*H02J 7/02* (2016.01)
*B60R 11/02* (2006.01)
*B64D 11/00* (2006.01)
*B60R 11/00* (2006.01)

(52) U.S. Cl.
CPC .............. *H02J 7/025* (2013.01); *H02J 7/042* (2013.01); *B60R 2011/0071* (2013.01)

(58) Field of Classification Search
USPC ........ 324/76.11, 126, 156; 297/217.1, 217.2, 297/217.3; 439/34
See application file for complete search history.

(56) References Cited

U.S. PATENT DOCUMENTS

| | | | |
|---|---|---|---|
| 5,684,673 A * | 11/1997 | Shibasaki | G06F 1/1632 361/679.42 |
| 7,156,594 B1 | 1/2007 | Witt et al. | |
| 7,948,208 B2 * | 5/2011 | Partovi | H02J 7/0027 320/108 |
| 8,061,550 B2 | 11/2011 | Browne et al. | |
| 2002/0095245 A1 * | 7/2002 | Kamewada | B60R 11/02 701/1 |
| 2005/0072691 A1 * | 4/2005 | Schlansky | B60R 11/00 206/232 |
| 2006/0237611 A1 * | 10/2006 | Sturt | B60N 3/106 248/311.2 |
| 2011/0278885 A1 | 11/2011 | Procter et al. | |
| 2012/0098280 A1 * | 4/2012 | Handing | B60R 19/34 293/118 |
| 2014/0028966 A1 * | 1/2014 | Blum | G02C 7/083 351/121 |
| 2014/0160044 A1 * | 6/2014 | Yairi | G06F 3/016 345/173 |
| 2014/0197936 A1 * | 7/2014 | Biggs | G08B 6/00 340/407.1 |
| 2015/0331525 A1 * | 11/2015 | Yairi | F04B 43/113 345/173 |

* cited by examiner

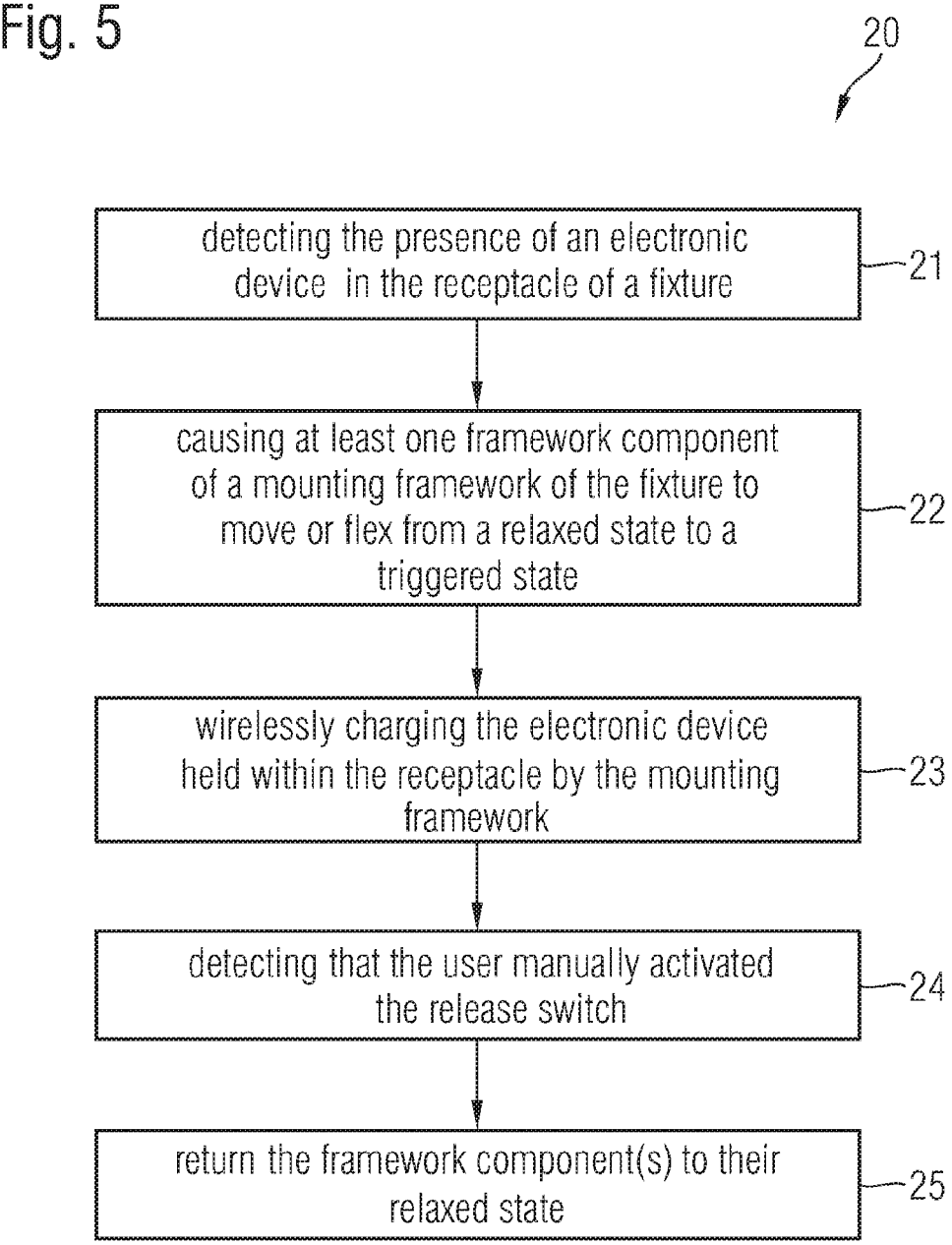

FIXTURE FOR ELECTRONIC DEVICES, VEHICLE SEAT WITH INTEGRATED FIXTURE AND METHOD FOR MOUNTING AN ELECTRONIC DEVICE IN A FIXTURE

CROSS-REFERENCE TO RELATED APPLICATION

This application claims priority to EP 14 195 478.4 filed Nov. 28, 2014, the entire disclosure of which is incorporated by reference herein.

TECHNICAL FIELD

The present disclosure pertains to a fixture for electronic devices, a vehicle seat with an integrated fixture and a method for mounting an electronic device in a fixture for electronic devices, in particular with respect to fixtures and seats in aircraft or spacecraft.

Although applicable for any kind of vehicle seat, the present disclosure and the corresponding underlying problems will be explained in further detail in conjunction with an aircraft.

BACKGROUND

Personal electronic devices (PEDs) become increasingly widespread. Usually those PEDs get carried around along with the user wherever he travels, including on board of aircraft. Considering the manifold communication interfaces which such PEDs comprise it is desirable to provide passengers on board an aircraft with access to the different networks of the aircraft, for example a wireless local area network (WLAN). Mobile content distribution networks on board of aircraft allow extending comfort amenities and services such as internet access, on-board shopping opportunities and access to in-flight entertainment (IFE) systems.

Moreover, it may contribute to a passenger's comfort, if PEDs may be temporarily deposited or placed down in a receptacle that facilitates operating the PED and viewing graphical display units of the PED in a convenient manner. When cradled in such a receptacle, airlines usually offer charging facilities for the PEDs utilizing USB ports, power grid connectors and/or wireless charging such as Qi or Power Matters Alliance (PMA) charging.

PEDs additionally often incorporate near field communication (NFC) circuitry comprising NFC chips and corresponding antennas. NFC is a wireless technology allowing two NFC-enabled devices to wirelessly communicate over a short distance of several centimeters. NFC is standardized internationally within NFC Forum specifications and defined in, for example, ISO/IEC 18092, ISO/IEC 18000-3, ISO/IEC 21481, ECMA-340, ISO 14443, and the like. A main application area for NFC technology is contactless, short-range communications on the basis of radio frequency identification (RFID) standards.

NFC utilizes electromagnetic field induction that enables communication between PEDs such as laptops, mobile phones, smartphones, tablet PCs and the like.

The document US 2011/0278885 A1 discloses coupling assemblies for portable electronics devices including a cradle configured to electronically couple and releasably engage a portable electronics device, and an adaptor configured to electronically couple and releasably engage the cradle to a passenger seat.

The document U.S. Pat. No. 8,061,550 B2 discloses reconfigurable bins which include at least one structural component formed of shape memory materials such as a shape memory polymer, a shape memory alloy, or a combination thereof. The shape memory material of the reconfigurable bins is in operative communication with an activation device adapted to provide an activation signal effective to change at least one attribute of the shape memory material such that the bin can be reconfigured from a first shape to a second shape.

SUMMARY

It is one idea, feature and/or concept of the disclosure herein to flexibly allow mounting electronic devices, for example aircraft passengers' PEDs, to fixtures for holding such electronic devices, irrespective of size and type of the electronic devices.

According to a first aspect of the disclosure herein, a fixture for electronic devices comprises a substantially planar receptacle, and a mounting framework arranged at least partially at the surrounding edges of the receptacle, the mounting framework comprising at least one framework component comprising a shape memory material and/or an electro-active polymer, wherein the framework component exhibits a relaxed state and a triggered state in which the framework component is moved or flexed inwardly into the area of the receptacle.

According to a second aspect of the disclosure herein, a vehicle seat comprises an integrated fixture for electronic devices according to the first aspect of the disclosure herein, and a framework controller coupled to the fixture and configured to emit an activation signal to the at least one framework component, the activation signal being configured to control the at least one framework component to move from its relaxed state to its triggered state.

According to a third aspect of the disclosure herein, a method for mounting an electronic device in a fixture according to the first aspect of the disclosure herein comprises detecting the presence of an electronic device in the receptacle, and causing the at least one framework component to move or flex from its relaxed state to its triggered state, thereby grabbing the electronic device at its edges or corners and holding it in place within the area of the receptacle.

One idea of the present disclosure is to equip a fixture for electronic devices with a mounting framework which includes at least some components being made from shape memory material. Depending on the size of the electronic device being brought into the fixture, the components from shape memory material may be triggered by some suitable activation signal to alter their shape and thus to adapt the size of the mounting framework to the size of the electronic device. That way, fixture can be flexibly used for a large range of sizes of electronic devices.

Due to the application of shape memory material, the movable components of the mounting framework electronic devices may exert a grabbing force onto the edges of the electronic device being mounted, thus holding the electronic device securely in place. This is particularly advantageous for applications in aviation, where the electronic devices need to be securely stowed under all flight conditions, for example critical operational flight phases such as take-off, landing and taxi.

The fixture may advantageously be arranged in the backrest of a vehicle seat so that a person sitting in a seat behind the vehicle seat with the integrated fixture may stow his PED in the fixture. By flexibly allowing storage opportunities for all sorts and sizes of PEDs, passengers on board of aircraft may always bring their own PEDs and use them in a convenient manner.

According to an embodiment of the fixture, the framework component may comprise at least one bracket element which is configured to perform an angling motion into the area of the receptacle when moving from its relaxed state to its triggered state.

According to a further embodiment of the fixture, the fixture may further comprise four bracket elements which are arranged at corners of the rectangular receptacle. Those bracket elements may securely hold the electronic device in place while still allowing access to interface ports such as switches, USB ports or SD card slots which are commonly arranged at the edges of electronic devices.

According to a further embodiment of the fixture, the framework component may comprise at least one looped element which encircles a first portion of the area of the receptacle in its relaxed state and a second portion of the area of the receptacle in its triggered state, the first portion being larger than the second portion. Particularly, the second portion of the area of the receptacle may have an annular or elliptical shape. The ring shape will come into contact with corners of usually rectangularly shaped electronic device, thus leaving space at the edges of the electronic devices for access to interface ports of the electronic device.

According to an embodiment of the vehicle seat, the vehicle seat may further comprise a charging coil arranged in the vicinity of the receptacle, and a fixture controller coupled to the charging coil and the framework controller, wherein the fixture controller is configured to detect the presence of an electronic device in the proximity of the charging coil and to cause the framework controller to emit the activation signal, if the presence of an electronic device in the proximity of the charging coil has been detected.

According to a further embodiment of the vehicle seat, the vehicle seat may further comprise a charging controller coupled to the charging coil and configured to wirelessly charge an electronic device held in the fixture by the charging coil.

According to a further embodiment of the vehicle seat, the vehicle seat may further comprise a release switch coupled to the framework controller and configured to cause the framework controller to cease transmitting the activation signal to the framework component upon manual activation.

Such vehicle seats may in particular embodiments be employed in an aircraft.

According to an embodiment of the method, detecting the presence of an electronic device may comprise detecting a radio frequency signal in the vicinity of a coil near the receptacle. Thus, electronic devices with radio frequency based communication capacities may be automatically detected upon placement into the receptacle and the grabbing mechanism may be automatically activated.

According to a further embodiment of the method, the method may further comprise detecting the manual activation of a release switch, when the at least one framework component is kept in its triggered state, and returning the framework component to its relaxed state, if an activation of the release switch is detected. This allows easy access to a push button or similar device, if a user wants to remove his electronic device from the receptacle without having to pry it from the grabbing framework components.

According to a further embodiment of the method, the method may further comprise wirelessly charging the electronic device held within the receptacle by the mounting framework. Since laptops or portable computers with cable-bound charging interfaces are steadily on the decline, this may advantageously cater to more advanced devices such as smartphones and tablet PCs which employ wireless technologies for communication and charging in particular.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

FIG. 5 schematically illustrates a flow diagram of a method for mounting an electronic device in a fixture for electronic devices according to a further embodiment of the disclosure herein.

Figure 1:
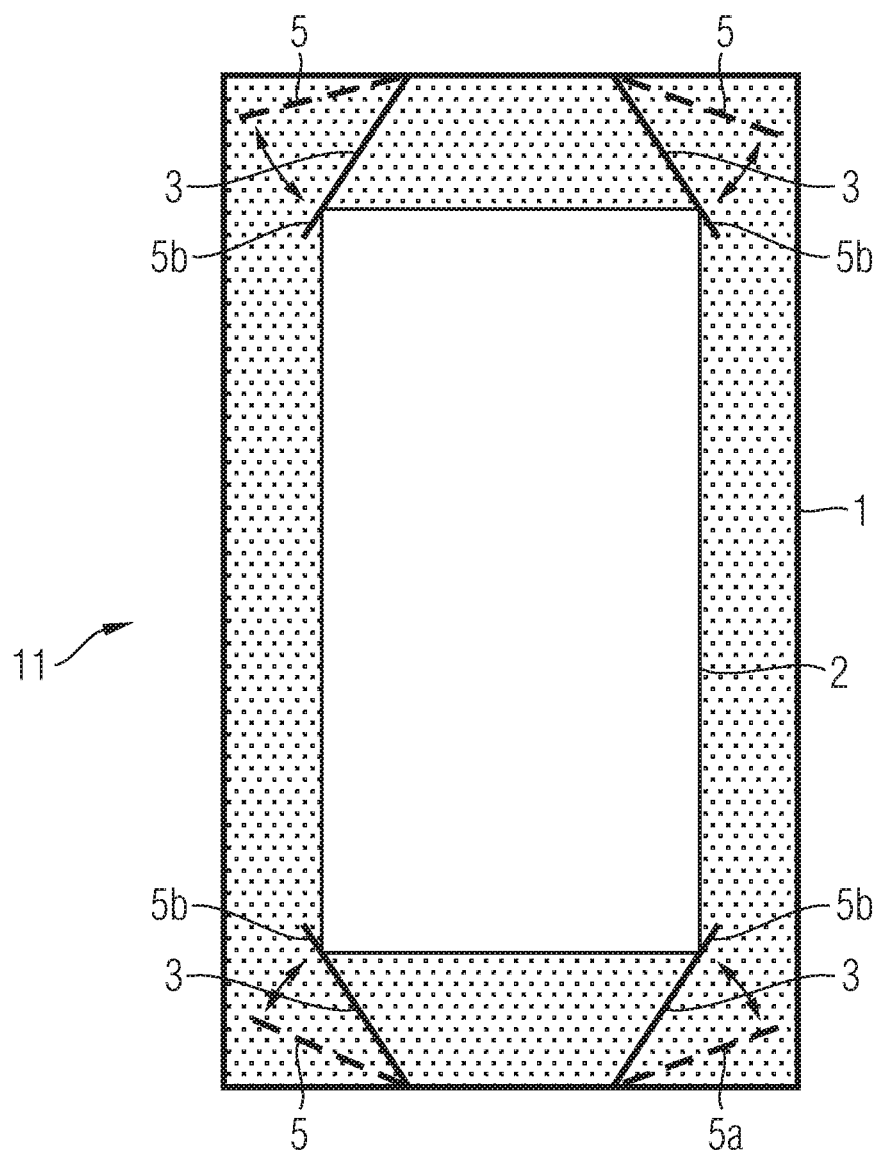
FIG. 1 schematically illustrates a plan view of a fixture for electronic devices according to an embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Fixtures within the meaning of the present disclosure may comprise any type of receptacle, mounting, holder, cradle or similar attachment structure that includes a recess or hollow for receiving an object to be fixed and/or held therein. Fixtures within the meaning of the present disclosure are, by way of design, configured to exert countering mechanical forces onto two or more edges, corners or boundary elements of the held object so that the object is tightly secured in its place within the fixture.

Personal electronic devices (PEDs) within the meaning of the present disclosure comprise all electronic devices which may be employed for entertainment, communication and/or office purposes. For example, PEDs may comprise all sorts of end terminals, such as laptops, mobile phones, smartphones, handheld devices, palmtops, tablet PCs, GPS devices, navigation devices, audio devices such as MP3 players, portable DVD or Bluray® players or digital cameras.

Seats within the meaning of the present disclosure may comprise any form of structural components intended to host a passenger for the duration of a flight of an aircraft, the seat being a location which may be used personally and at least temporarily exclusively by the passenger of the aircraft during the flight. Seats within the meaning of the disclosure herein may be aircraft seats, but also loungers, armchairs, beds, suites of the first or royal class or similar seating furniture within an aircraft.

Shape memory materials (SMMs) within the meaning of the present disclosure may comprise shape memory polymers (SMPs), shape memory alloys (SMAS) and electroactive polymers (EAPs).

SMPs may generally refer to any type of polymeric material which exhibits a change in a property, such as an elastic modulus, a shape orientation, or a combination comprising at least one of the foregoing properties upon application of an activation signal, for example a thermal, magnetic, electrical or chemical activation signal, or a combination comprising at least one of the foregoing activation signals. SMPs may include phase segregated copolymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP.

It should be recognized by one of ordinary skill in the art that it is possible to configure SMPs in many different forms and shapes. Engineering the composition and structure of the polymer itself can allow for the choice of a particular temperature for a desired application. The SMP may be heated by any suitable approach or means. For example, for elevated temperatures, heat may be supplied using electrical current. The activator may, for example, be in the form of heat conduction from a heated element in contact with or in proximity of the SMP, such as an infrared heating, a resistive heating, a thermoelectric heating, or the like.

Suitable shape memory polymers, regardless of the particular type of SMP, can be thermoplastics, thermosets-thermoplastic copolymers, interpenetrating networks, semi-interpenetrating networks, or mixed networks. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly (butyl methacrylate), poly(isobutyl methacrylate), poly (hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), poly (ethylene vinyl acetate), polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like.

Similar to SMPs, SMAS may exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the SMA is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the SMAS are softer and more easily deformable in their martensitic phase and are harder, stiffer, and/or more rigid in the austenitic phase. In view of the foregoing properties, expansion of the SMA may be at or below the austenite transition temperature (at or below As). Subsequent heating above the austenite transition temperature may cause the expanded shape memory alloy to revert back to its permanent shape. Thus, a suitable activation signal for use with SMAS is a thermal activation signal having a magnitude to cause transformations between the martensite and austenite phases.

Suitable SMA materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable SMA composition depends on the temperature range where the component will operate.

EAPs include those polymeric materials that exhibit piezoelectric, pyroelectric, or electrostrictive properties in response to electrical or mechanical fields. An example would be an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an EAP may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

As mentioned above, the mounting brackets for a fixture for electronic devices may generally include a structural component that is at least partially formed from an SMP, SMA, EAP or any combination thereof. The SMAS and SMPs have a selected thermal transition temperature whereas a suitable voltage is applied in the case of EAPs at which these shape memory materials undergo a change in its modulus of elasticity and/or shape. The change in the modulus of elasticity either allows (for an unloaded article) or results in (for a loaded article) a change in the shape of at least the structural component. The SMPs or SMAS of the structural component may be in the form of a solid such as a wire, a sheet, a slab, a ring or any other possible geometric shape. The EAPs exhibit a similar behaviour albeit as a function of applied voltage and will generally have a solid form.

FIG. 1 schematically illustrates a plan view of a fixture 11 for an electronic device 2. The fixture 11 generally comprises a receptacle which may be rectangular in shape. The receptacle may be substantially planar and may serve as supporting structure for the generally planar backside of an electronic device such as a PED, for example a tablet PC, a phablet, a smartphone or similar. The electronic device 2 as exemplarily illustrated in FIG. 1 is shown to be generally rectangular in shape as well, however, it should be noted that any other outer shape for the electronic device 2 may be possible as well.

The receptacle of the fixture 11 may for example be fabricated from any suited rigid material such as plastics or metal. The receptacle may generally include a plate-like flat member that may be attached to or inserted in a vehicle seat, for example in the backrest or headrest of a vehicle seat.

The receptacle may be recessed by a certain depth so that an electronic device 2 placed into or onto the receptacle will be at least partially inserted into the fixture 11. The electronic device 2 may be placed into the receptacle with a display module thereof facing outwardly from the fixture, thereby enabling viewing graphical content displayed on the display module to be seen by a user when looking onto the electronic device 2 held within the fixture 11. As exemplarily shown in FIG. 1, the electronic device 2 may be placed into the receptacle with the display oriented in portrait mode, however, any other orientation may be possible as well, for example the placement of the electronic device 2 into the receptacle with the display being oriented generally in a landscape mode.

The electronic device 2 may for example comprise a charging unit which may be arranged near to a solenoid integrated within the fixture 11. For example, a solenoid may be placed within or behind the placement are of the receptacle.

When the electronic device 2 is properly placed into the receptacle of the fixture 11, the charging unit of the electronic device 2 may establish a communication link with the solenoid of the fixture 11, for example by inductive energy coupling. The communication link may be used to perform inductive power coupling to allow energy to be transferred from a power supply connected to the solenoid to an electrical energy storage of the electronic device without the need for a wirebound connection therebetween. Across the solenoid an oscillating electric potential may be applied which sets up an oscillating magnetic field in the vicinity of the solenoid. The oscillating magnetic field may induce a secondary oscillating electrical potential in a coil within the charging unit of the electronic device placed close to the solenoid within the fixture 11, thereby transmitting electrical energy from the solenoid to the charging unit by electromagnetic induction without a conductive connection between the solenoid and the coil of the charging unit. The solenoid of the fixture 11 may be adapted to generate an electromagnetic field suitable to induce a current in a coil of the charging unit.

The solenoid within the fixture 11 may be driven by a transfer driver which in turn may be controlled by a charging controller. The charging controller may be adapted to control the charging functionality of the solenoid within the fixture 11 by issuing respective control signals to the transfer driver. For example, the charging controller may be adapted to communicate with the electronic device 2 according to the Qi standard to initiate a wireless charging process.

The fixture 11 may further be equipped with power plugs (not shown) that may be used to connect the electronic device 2 placed within the receptacle with an external power supply network. A power line may be connected to the power plug of the fixture 11 to draw power from power sources such as for example aircraft internal power sources, such as a 28 VDC power network of the aircraft, and distribute it to the individual fixtures 11. The fixture 11 may also comprise other types of plugs, for example USB ports or LAN ports for connecting an electronic device 2 thereto by cable. The USB ports or LAN ports may be connected to a data line by which control signals, configuration data or data signals may be provided to and from the individual fixtures 11 and, hence, cable-connected electronic devices 2 held therein.

The fixture 11 further comprises a mounting framework 1 that is arranged at least partially at the surrounding edges of the receptacle. The mounting framework 1 may form a closed loop around the area of the receptacle and may generally extend outwardly from the plane of extension of the receptacle, thereby forming a tray structure for placing an electronic device 2 therein. The mounting framework 1 comprises at least one framework component 3. The framework component 3 may for example be a bracket element 3 which is configured to perform an angling motion into the area of the receptacle.

The angling motion is exemplarily depicted in FIG. 1: The relaxed state of the bracket element 3 is indicated with the dashed line and the reference sign 5a, whereas the triggered state is indicated by the unbroken line and the reference sign 5b. When moving from its relaxed state 5a to its triggered state 5b, the bracket element 3 swings inwardly from the general outline of the mounting framework 1, thereby effectively diminishing the area fenced in by the mounting framework 1.

An electronic device 2 that is smaller in outer dimensions than the dimensions of the enclosed by the mounting framework 1 with the framework components 3 being held in their relaxed state 5a will be firmly grabbed by the framework components 3. Due to the angling motion and the concomitant continuous diminishing of the surrounded area on the receptacle, the bracket elements 3 will at some point come into contact with the corners or edges of the electronic device 2 placed in the receptacle.

As exemplarily shown in FIG. 1 the fixture 11 comprises four bracket elements 3 which are arranged at corners of the rectangular receptacle. The bracket elements 3 may be controlled by respective control signals to change their state from the relaxed state 5*a* and the triggered state 5*b* to be moved or flexed inwardly into the area of the receptacle (and back, if applicable). Depending on the control of the bracket elements 3, the bracket elements 3 will exert a grabbing force onto the electronic device 2. The countering grabbing forces of respectively opposite bracket elements 3 will mechanically keep the electronic device pinched therebetween and thus tightly in place within the fixture 11. The grabbing forces may be designed to comply with safety standards, such as the head injury compliance (HIC) security regulations on board of aircraft.

To effect the revertible change from their relaxed state 5*a* to their triggered state 5*b*, the framework components 3 may comprise a shape memory material and/or an electro-active polymer. For example, the framework components 3 may be wholly or partially fabricated from a suitable shape memory material and/or an electro-active polymer such that electric control signals applied to the framework components 3 may cause them to change their geometric shape.

Figure 2:
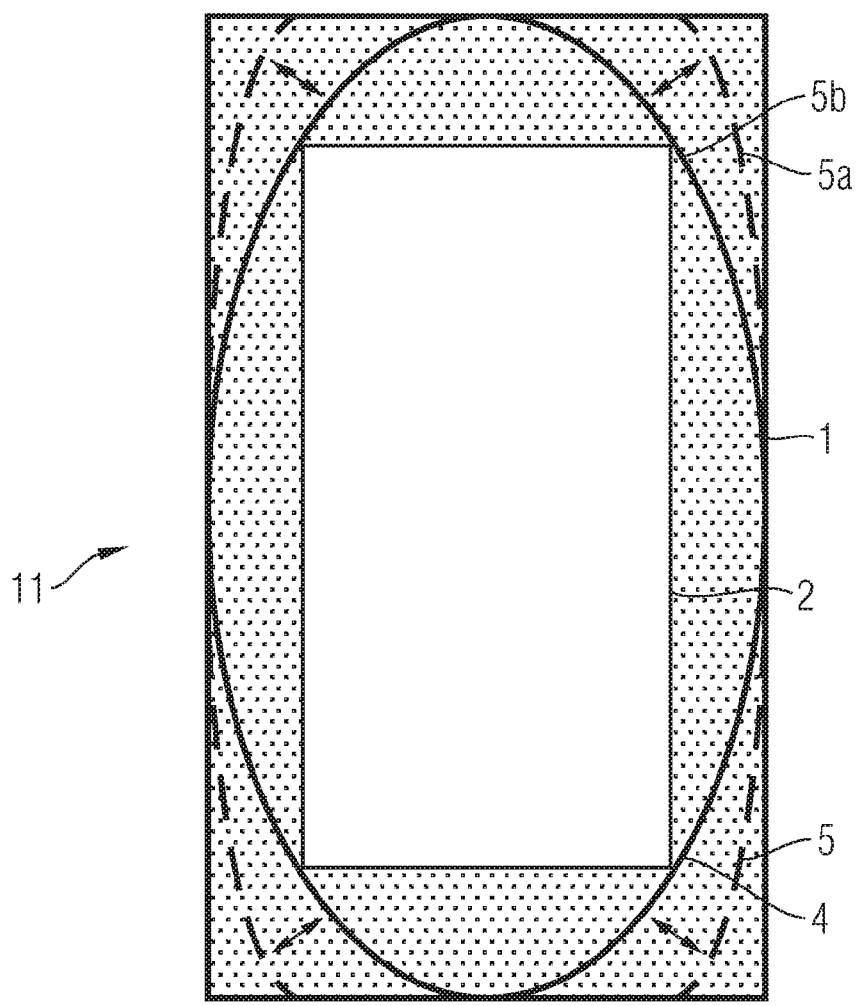
FIG. 2 schematically illustrates a plan view of another fixture for electronic devices according to another embodiment of the disclosure herein.

FIG. 2 schematically illustrates another possible variant for a fixture 11. The fixture 11 differs from the fixture in FIG. 1 mainly in that the framework component comprises at least one looped element 4 which encircles a first portion of the area of the receptacle in its relaxed state 5*a* and a second portion of the area of the receptacle in its triggered state 5*b*. Since the first portion is larger than the second portion, an electronic device 2 may be grabbed or pinched in between the framework component 4 and thus firmly held in place within the receptacle. The second portion of the area of the receptacle may in particular be completely encompassed by the first portion of the area of the receptacle, as indicated by the dashed and unbroken lines in FIG. 2, respectively.

It may be particularly useful to form the closed loop element 4 in the shape of an annular or elliptical shape so that an electronic device 2 having a rectangular shape will come into contact with the closed loop element 4 at its corners when the closed loop element 4 moves into its triggered state 5*b*. At the same time, due to the annular or elliptical shape, the edges of the electronic device 2 will still be spaced apart from the closed loop element 4 by a certain distance, thereby allowing free or unhindered access to ports and interfaces that may arranged at the edges of the electronic device 2.

Figure 3:
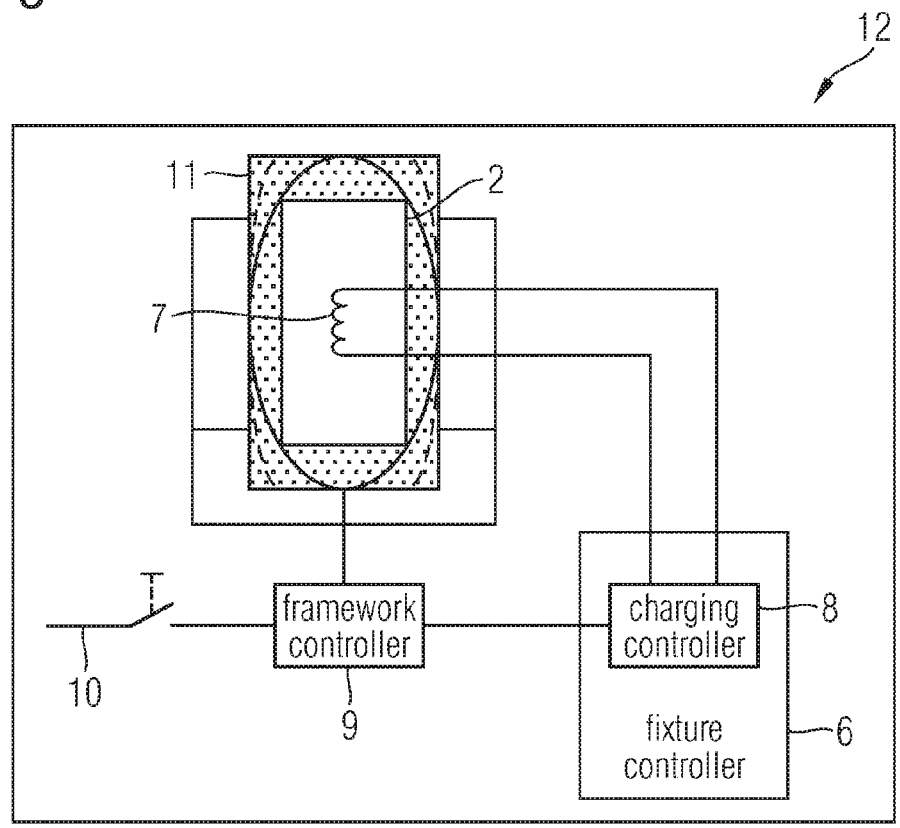
FIG. 3 schematically illustrates a vehicle seat with an integrated fixture for electronic devices and circuitry for controlling the fixture according to a further embodiment of the disclosure herein.

FIG. 3 schematically shows an illustration of a part of a vehicle seat 12 with an integrated fixture 11. For purposes of illustration, the fixture 11 is shown in the implementation of FIG. 2, however, other types of implementation such as the one of FIG. 1 may equally be possible for the setup of the vehicle seat in FIG. 3. The vehicle seat 12 may for example be installed in a passenger cabin of an aircraft with multiple seats. Each of the vehicle seats 12 may comprise armrests, headrests or backrests at which a fixture 11 may be installed or arranged. Of course, it may also be possible to arrange the fixtures 11 at different positions at or in the vicinity of the vehicle seat 12. For example, the fixture 11 may also be integrated into a tray table of a back rest of a vehicle seat 12.

Figure 4:
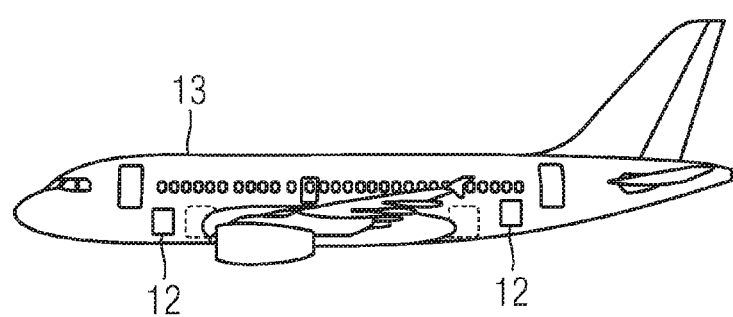
FIG. 4 schematically illustrates an aircraft comprising at least one seat with an integrated fixture for electronic devices according to a further embodiment of the disclosure herein.

FIG. 4 shows a schematic illustration of an aircraft 13 within which one or more vehicle seat such as the vehicle seat 12 in FIG. 3 may be installed. The aircraft 13 may in particular comprise vehicle seats 12 in its passenger cabin with fixtures integrated therein, such as the fixtures 11 as shown in and explained in conjunction with FIGS. 1 and 2.

The vehicle seat 12 comprises a fixture 11 with a receptacle and a mounting framework 1. The fixture 11 is coupled to a framework controller 9 which is configured to emit an activation signal to the framework component(s) 3, 4 of the mounting framework 1. The activation signal is used to control the framework component(s) 3, 4 to move from their relaxed state 5*a* to their triggered state 5*b*, for example by distortion of the respective shape memory material or the electro-active polymer.

The vehicle seat 12 may for example further comprise a charging coil 7 which is arranged in the vicinity of the receptacle of the fixture, for example in the middle of the receptacle. A fixture controller 6 may be coupled to the charging coil 7 and the framework controller 9. The fixture controller 6 may be configured to detect the presence of an electronic device 2 in the proximity of the charging coil 7. If an electronic device 2 has been detected, the fixture controller 6 causes the framework controller 9 to emit the activation signal. This causes the framework component(s) 3, 4 to distort in a way that the electronic device 2 is grabbed or clamped and held firmly in place in the receptacle.

Due to the clamping motion of the framework component(s) 3, 4, the electronic device 2 may at the same time be precisely positioned in relation to the charging coil 7 so that the charging coil 7 may be used for inductively transmitting electrical energy to a corresponding coil or solenoid within the electronic device 2 in a most energy efficient manner. To that end, the vehicle seat may further comprise a charging controller 8 coupled to the charging coil 7 which is configured to wirelessly charge an electronic device 2 held in the fixture 11 by the charging coil 7.

The vehicle seat 12 may further comprise a release switch 10 coupled to the framework controller 9. The release switch 10 may be manually activated by a user to cause the framework controller 9 to cease transmitting the activation signal to the framework component(s) 3, 4. Thereby, an owner or user of the electronic device 2 may free up the electronic device 2 from the receptacle again without the need to pry it free from the clamping grip of the framework component(s) 3, 4.

FIG. 5 shows a schematic illustration of a method 20 for mounting an electronic device in a fixture. For example, the method 20 may be used with a fixture 11 such as the one illustrated in and explained in conjunction with FIGS. 1 and 2. The method 20 may be particularly employed for integrated fixtures in vehicle seats, such as the vehicle seat 12 in FIG. 3. The method 20 may specifically be suited for employment and performance in aircraft for fixtures installed in aircraft seats, such as the seats in the aircraft 13 as illustrated in FIG. 4.

The method 20 comprises at 21 detecting the presence of an electronic device 2 in the receptacle of a fixture 11. This may for example be done by detecting a radio frequency signal in the vicinity of a coil 7 near the receptacle of the fixture 11. When it has been detected that an electronic device 2 has been placed in the receptacle, the method 20 comprises at 22 causing at least one framework component 3, 4 of a mounting framework 1 of the fixture 11 to move or flex from a relaxed state 5*a* to a triggered state 5*b*. This causes the framework component(s) 3, 4 to mechanically engage with outer edges or corners of the electronic device 2, thereby grabbing the electronic device 2 at its edges or corners and holding it in place within the area of the receptacle of the fixture 11.

The method 20 further comprises at 23 wirelessly charging the electronic device 2 held within the receptacle by the mounting framework 1. This may conveniently be done by a coil or solenoid within or behind the receptacle of the fixture 11 with which a wireless communication link and/or inductive energy transfer link may be established by a respective coil or solenoid within the electronic device 2.

As long as the wireless communication link and/or inductive energy transfer link is kept established, the electronic device 2 may be firmly held in place by the mounting framework 1 and in particular the framework component(s) grabbing the edges or corners of the electronic device 2. If a user or owner of the electronic device 2 wishes to remove the electronic device 2 from the fixture 11, he may manually activate a release switch 10, for example a pushbutton. The release switch 10 stands in operative connection with the control mechanism for keeping the framework component(s) 3, 4 in their triggered state. Thus, when at 24 it is detected that the user manually activated the release switch 10, the method 20 may at 25 return the framework component(s) 3, 4 to their relaxed state 5a.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the composite reinforcement components and structural elements can be applied accordingly to the aircraft or spacecraft according to the disclosure herein and the method according to the disclosure herein, and vice versa.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

What is claimed is:

1. A fixture for an electronic device, comprising:
a substantially planar receptacle; and
a mounting framework arranged at least partially at surrounding edges of the receptacle to form a closed loop around an area of the receptacle, the mounting framework comprising at least one framework component comprising a shape memory material and/or an electro-active polymer,
wherein the at least one framework component comprises at least one closed looped element, which encircles a first portion of the area of the receptacle in its relaxed state and which encircles a second portion of the area of the receptacle in its triggered state, the first portion being larger than the second portion, and
wherein the at least one framework component exhibits a relaxed state and a triggered state, in which the at least one framework component is moved or flexed inwardly into an area of the receptacle.

2. The fixture according to claim 1, wherein the second portion of the area of the receptacle has an annular or elliptical shape.

3. The fixture according to claim 1, wherein the second portion of the area of the receptacle is completely encompassed by the first portion of the area of the receptacle.

4. A vehicle seat comprising:
a fixture comprising:
a substantially planar receptacle; and
a mounting framework arranged at least partially at surrounding edges of the receptacle, the mounting framework comprising at least one frame-work component comprising a shape memory material and/or an electro-active polymer, the at least one framework component exhibiting a relaxed state and a triggered state, in which the at least one framework component is moved or flexed inwardly into an area of the receptacle;
a framework controller coupled to the fixture and configured to emit an activation signal to the at least one framework component, the activation signal being configured to control the at least one framework component to move from its relaxed state to its triggered state;
a charging coil arranged in a vicinity of the receptacle; and
a fixture controller coupled to the charging coil and the framework controller,
wherein the fixture controller is configured to detect presence of an electronic device in proximity to the charging coil and to cause the framework controller to emit the activation signal when the presence of the electronic device in proximity to the charging coil is detected.

5. The vehicle seat according to claim 4, comprising a charging controller coupled to the charging coil, wherein the charging controller is configured to wirelessly charge the electronic device, when the electronic device is held in the fixture, by the charging coil.

6. The vehicle seat according to claim 4, comprising a release switch coupled to the framework controller, wherein the release switch is configured to cause the framework controller to cease transmitting the activation signal to the at least one framework component upon manual activation of the release switch.

7. A vehicle seat, comprising:
a fixture having:
a substantially planar receptacle;
a mounting framework arranged at least partially at surrounding edges of the receptacle to form a closed loop around an area of the receptacle, the mounting framework comprising at least one framework component comprising a shape memory material and/or an electro-active polymer, the at least one framework component exhibiting a relaxed state and a triggered state, in which the at least one framework component is moved or flexed inwardly into an area of the receptacle, wherein the at least one framework component comprises at least one closed looped element, which encircles a first portion of the area of the receptacle in the relaxed state and which encircles a second portion of the area of the receptacle in the triggered state, the first portion of the receptacle being larger than the second portion of the receptacle; and
a framework controller configured to emit an activation signal to the at least one framework component, the activation signal being configured to control the at least one framework component to move from its relaxed state to its triggered state.

8. A method for mounting an electronic device in a fixture, the fixture having:
   a substantially planar receptacle;
   a mounting framework arranged at least partially at surrounding edges of the receptacle, the mounting framework comprising at least one framework component comprising a shape memory material and/or an electro-active polymer, the at least one framework component exhibiting a relaxed state and a triggered state, in which the at least one framework component is moved or flexed inwardly into an area of the receptacle,
   the method comprising:
   detecting a presence of an electronic device in the receptacle; and
   moving or flexing the at least one framework component from its relaxed state to its triggered state, thereby grabbing the electronic device at its edges or corners and holding it in place within the area of the receptacle,
   wherein detecting the presence of the electronic device comprises detecting a radio frequency signal in a vicinity of a coil near the receptacle.

9. The method according to claim 8, comprising:
   detecting a manual activation of a release switch while the at least one framework component is in the triggered state; and
   returning the at least one framework component to the relaxed state when the manual activation of the release switch is detected.

10. The method according to claim 8, comprising wirelessly charging the electronic device held within the receptacle by the mounting framework.

11. An aircraft comprising at least one vehicle seat, the vehicle seat comprising:
   a fixture comprising:
      a substantially planar receptacle; and
      a mounting framework arranged at least partially at surrounding edges of the receptacle, the mounting framework comprising at least one framework component comprising a shape memory material and/or an electro-active polymer, the at least one framework component exhibiting a relaxed state and a triggered state, in which the at least one framework component is moved or flexed inwardly into an area of the receptacle; and
      a framework controller configured to emit an activation signal to the at least one framework component, the activation signal being configured to control the at least one framework component to move from the relaxed state to the triggered state;
      a charging coil arranged in a vicinity of the receptacle; and
      a fixture controller coupled to the charging coil and the framework controller,
   wherein the fixture controller is configured to detect a presence of an electronic device in proximity of the charging coil and to cause the framework controller to emit the activation signal when the presence of the electronic device in proximity of the charging coil is detected.

12. An aircraft comprising at least one vehicle seat, the vehicle seat comprising:
   a fixture having:
      a substantially planar receptacle; and
      a mounting framework arranged at least partially at surrounding edges of the receptacle to form a closed loop around an area of the receptacle, the mounting framework comprising at least one framework component comprising a shape memory material and/or an electro-active polymer, the at least one framework component exhibiting a relaxed state and a triggered state, in which the at least one framework component is moved or flexed inwardly into the area of the receptacle, wherein the at least one framework component comprises at least one closed looped element, which encircles a first portion of the area of the receptacle in the relaxed state and which encircles a second portion of the area of the receptacle in the triggered state, the first portion of the receptacle being larger than the second portion of the receptacle; and
   a framework controller coupled to the fixture and configured to emit an activation signal to the at least one framework component, wherein the activation signal is configured to control the at least one framework component to move from the relaxed state to the triggered state.

* * * * *